United States Patent
Hsu

(10) Patent No.: US 9,374,790 B2
(45) Date of Patent: Jun. 21, 2016

(54) DOWNLINK POWER CONTROL ADJUSTMENT BASED ON LOST FRAME PORTION DETERMINATION

(71) Applicant: QUALCOMM Incorporated, San Diego, CA (US)

(72) Inventor: Chih-Ping Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 14/516,412

(22) Filed: Oct. 16, 2014

(65) Prior Publication Data

US 2016/0112959 A1 Apr. 21, 2016

(51) Int. Cl.
*H04W 52/14* (2009.01)

(52) U.S. Cl.
CPC .................. *H04W 52/143* (2013.01)

(58) Field of Classification Search
CPC ......................................... H04W 52/00–52/60
USPC .......................................... 455/522; 370/318
See application file for complete search history.

(56) References Cited

U.S. PATENT DOCUMENTS

| 8,094,554 | B2 | 1/2012 | Gholmieh et al. |
| 8,520,628 | B2 | 8/2013 | Teague et al. |
| 8,582,509 | B2 | 11/2013 | Khandekar et al. |
| 2013/0337861 | A1 | 12/2013 | Bhogaraju et al. |
| 2014/0133317 | A1 | 5/2014 | Chen et al. |

FOREIGN PATENT DOCUMENTS

| EP | 1143634 A1 | 10/2001 |
| WO | 2006006895 A1 | 1/2006 |
| WO | 2008052201 A2 | 5/2008 |

OTHER PUBLICATIONS

Ericsson: "Dual-SIM Dual-Standby UEs and their impact on the RAN", 3GPP Draft; R2-115375 Dual-SIM Dual-Standby UEs and Their Impact on the RAN, 3rd Generation Partnership Project (3GPP), Mobile Competence Centre; 650, Route Des Lucioles; F-06921 Sophia-Antipolis Cedex; France, vol. RAN WG2, No. Zhuhai; Oct. 10, 2011, Oct. 3, 2011, XP050540879, pp. 1-3, [retrieved on Oct. 3, 2011].
International Search Report and Written Opinion—PCT/US2015/050042—ISA/EPO—Nov. 19, 2015.

*Primary Examiner* — Raymond Dean
(74) *Attorney, Agent, or Firm* — Foley & Lardner LLP

(57) ABSTRACT

Systems, methods, apparatuses, and media are provided for downlink power control. Embodiments include determination that a portion of a frame to be transmitted in a downlink from a base station to a user equipment (UE) may be lost by the UE. Embodiments further include determination that a portion of the frame will be received by the UE. Embodiments further include causing a transmit power of the base station to be increased for the portion of the frame that will be received.

30 Claims, 11 Drawing Sheets

DOWNLINK POWER CONTROL ADJUSTMENT BASED ON LOST FRAME PORTION DETERMINATION

BACKGROUND

1. Field

Embodiments described herein generally relate to control of downlink transmission power based on determination that frame portions may be lost by a user equipment.

2. Background

A user equipment ("UE"), such as a mobile phone device, may be enabled for one or more radio access technologies ("RATs"), such as Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), Wi-Fi, PCS, or other protocols that may be used in a wireless communications network or a data communications network. One or more RATs may be enabled by one, or a plurality of subscriber identity modules ("SIMs"). For example, a UE may be a multi-SIM UE, where each of a plurality of SIMs received or otherwise coupled to the multi-SIM UE may support one or more RATs.

SUMMARY

Various embodiments relate to control of downlink transmission power based on determination that frame portions may be lost by a user equipment.

According to some embodiments, a method for downlink power control is provided. The method includes determining that a portion of a first frame to be transmitted in a downlink from a base station to a user equipment (UE) may be lost by the UE. The method further includes determining that a portion of the first frame will be received by the UE. The method further includes causing a transmit power of the base station to be increased for the portion of the first frame that will be received.

In some embodiments, the transmit power of the base station is caused to be increased for the portion of the first frame that will be received by adjusting a signal-to-interference ratio target value maintained by the UE.

In some embodiments, the signal-to-interference ratio target value is adjusted proportionally to a length of the portion of the first frame that will be received compared to a total length of the first frame.

In some embodiments, the signal-to-interference ratio target value is adjusted to an increased value at the start of the first frame.

In some embodiments, the transmit power of the base station is caused to be increased based on transmitting transmit power control commands from the UE to the base station.

In some embodiments, the portion of the first frame that may be lost is determined based on a scheduled tune-away.

In some embodiments, the portion of the first frame that may be lost is determined based on a tune-away from a first radio access technology to a second radio access technology different from the first radio access technology.

In some embodiments, the first frame is a frame in a dedicated channel for a first radio access technology. In such embodiments, the portion of the first frame that may be lost may be determined based on a scheduled use of a shared radio for a second radio access technology.

In some embodiments, the portion of the first frame that may be lost is a portion of the first frame that will be transmitted by the base station but that may not be successfully decoded by the UE.

In some embodiments, the portion of the first frame that may be lost and the portion of the first frame that will be received are determined by the UE independent of the base station.

In some embodiments, the portion of the first frame that may be lost and the portion of the first frame that will be received are transmitted by the base station using a same coding rate and scheme.

In some embodiments, the portion of the first frame that may be lost and the portion of the first frame that will be received are transmitted by the base station using a same spreading scheme.

In some embodiments, the method further includes determining that a portion of a second frame transmitted in the downlink from the base station to the UE has been lost by the UE.

In some embodiments, the method further includes determining that a portion of the second frame will be received by the UE.

In some embodiments, the method further includes causing the transmit power of the base station to be increased for the portion of the second frame that will be received.

In some embodiments, the transmit power of the base station is separately caused to be increased for the portion of the first frame that will be received and the portion of the second frame that will be received.

In some embodiments, the transmit power of the base station is caused to be increased for the portion of the second frame that will be received by adjusting a signal-to-interference ratio target value maintained by the UE.

In some embodiments, the signal-to-interference ratio target value is adjusted to a first signal-to-interference value for the portion of the first frame that will be received. In such embodiments, the signal-to-interference ratio target value may be adjusted to a second signal-to-interference value for the portion of the second frame that will be received. In such embodiments, the first signal-to-interference value and the second signal-to-interference value may be different.

In some embodiments, the portion of the first frame that may be lost and the portion of the second frame that may be lost are determined based on a tune-away from a first radio access technology to a second radio access technology different from the first radio access technology.

In some embodiments, the first frame is a first frame in time overlapping with a period of the tune-away and the second frame is a last frame in time overlapping with the period of the tune-away.

According to some embodiments, a user equipment (UE) apparatus for downlink power control is provided. The UE apparatus includes a processor configured to determine that a portion of a first frame to be transmitted in a downlink from a base station to the UE apparatus may be lost by the UE apparatus. The processor may be further configured to determine that a portion of the first frame will be received by the UE apparatus. The processor may be further configured to cause a transmit power of the base station to be increased for the portion of the first frame that will be received.

In some embodiments, the processor is configured to cause the transmit power of the base station to be increased for the portion of the first frame that will be received by adjusting a signal-to-interference ratio target value maintained by the UE apparatus.

In some embodiments, the processor is configured to adjust the signal-to-interference ratio target value proportionally to a length of the portion of the first frame that will be received compared to a total length of the first frame.

In some embodiments, the processor is configured to determine the portion of the first frame that may be lost based on a scheduled tune-away.

In some embodiments, the processor is configured to determine the portion of the first frame that may be lost based on a tune-away from a first radio access technology to a second radio access technology different from the first radio access technology.

In some embodiments, the processor is configured to determine the portion of the first frame that may be lost and the portion of the first frame that will be received independent of the base station.

In some embodiments, the processor is further configured to determine that a portion of a second frame transmitted in the downlink from the base station to the UE apparatus has been lost by the UE apparatus. In such embodiments, the processor may be further configured to determine that a portion of the second frame will be received by the UE apparatus. In such embodiments, the processor may be further configured to cause the transmit power of the base station to be increased for the portion of the second frame that will be received.

In some embodiments, the processor is configured to separately cause the transmit power of the base station to be increased for the portion of the first frame that will be received and the portion of the second frame that will be received.

According to some embodiments, a non-transitory computer-readable medium for downlink power control is provided. The medium includes instructions configured to cause one or more computing devices to determine that a portion of a frame to be transmitted in a downlink from a base station to a user equipment (UE) may be lost by the UE. The instructions are further configured to cause the one or more computing devices to determine that a portion of the frame will be received by the UE. The instructions are further configured to cause the one or more computing devices to cause a transmit power of the base station to be increased for the portion of the frame that will be received.

According to some embodiments, a user equipment (UE) apparatus for downlink power control is provided. The UE apparatus includes means for determining that a portion of a first frame to be transmitted in a downlink from a base station to the UE apparatus may be lost by the UE apparatus. The UE apparatus further includes means for determining that a portion of the first frame will be received by the UE apparatus. The UE apparatus further includes means for causing a transmit power of the base station to be increased for the portion of the first frame that will be received.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the various embodiments.

DETAILED DESCRIPTION

Figure 1:
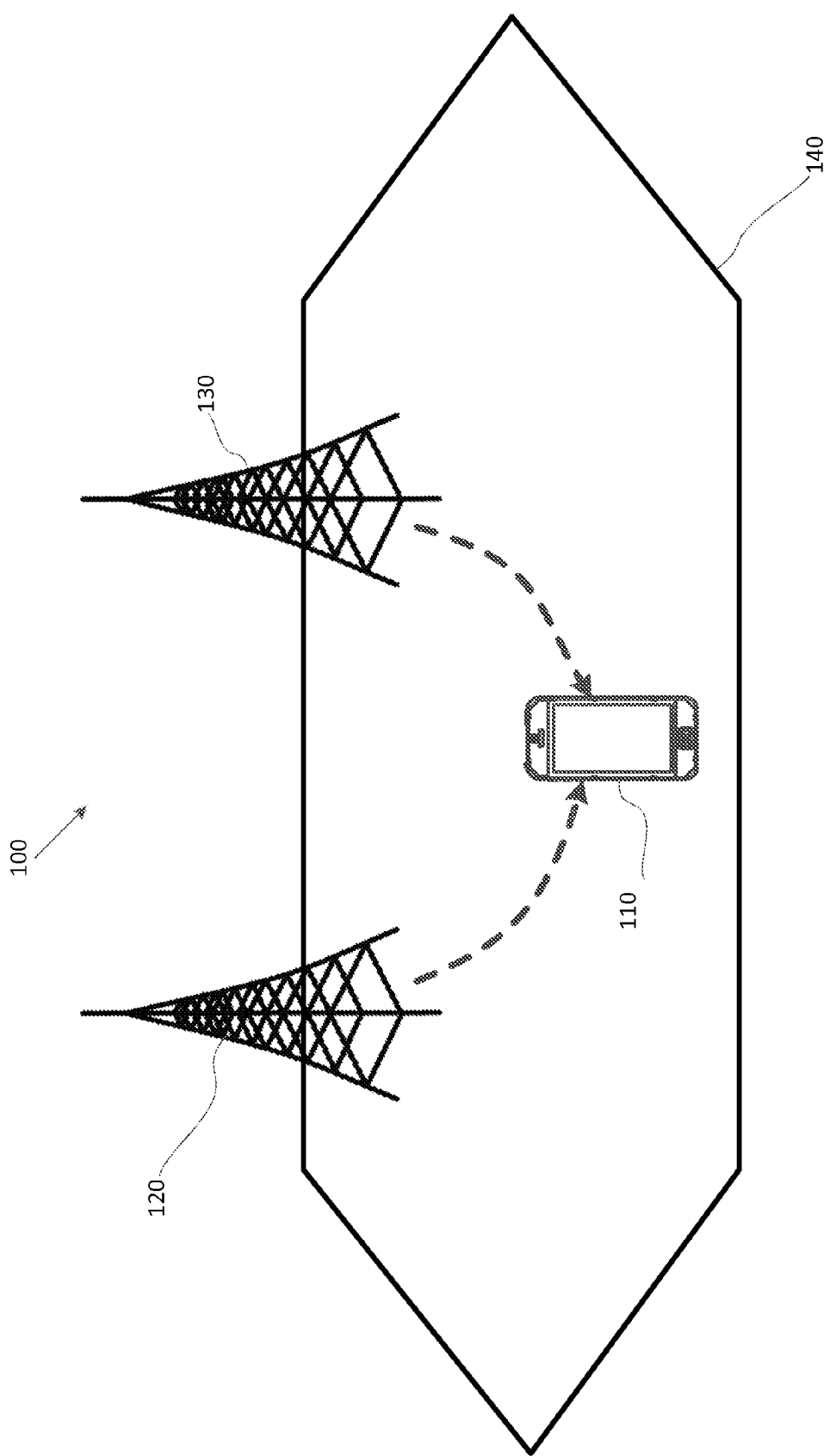
FIG. 1 is a schematic diagram illustrating an example of a system according to various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the invention or the claim.

Various modern communication devices are described herein. Such a modern communication device may be referred to herein as a user equipment ("UE"). However, such a modern communication device may also be referred to as a mobile station ("MS"), a wireless device, a communications device, a wireless communications device, a mobile device, a mobile phone, a mobile telephone, a cellular device, a cellular telephone, and in other ways. Examples of UE include, but are not limited to, mobile phones, laptop computers, smart phones, and other mobile communication devices of the like that are configured to connect to one or more RATs.

Some UE may contain one or more subscriber identity modules ("SIMs") that provide users of the UEs with access to one or multiple separate mobile networks, supported by radio access technologies ("RATs"). Examples of RATs may include, but are not limited to, Global Standard for Mobile ("GSM"), Code Division Multiple Access ("CDMA"), CDMA2000, Time Division-Code Division Multiple Access ("TD-CDMA"), Time Division-Synchronous Code Division Multiple Access ("TD-SCDMA"), Wideband-Code Division Multiple Access ("W-CDMA"), Time Division Multiple Access ("TDMA"), Frequency Division Multiple Access ("FDMA"), Long-Term Evolution ("LTE"), and the like.

Embodiments described herein relate to both single-SIM and multi-SIM UEs. A UE that includes a plurality of SIMs and connects to two or more separate RATs using a same set of RF resources (e.g., radio-frequency ("RF") transceivers) is a multi-SIM-multi-standby ("MSMS") communication device. In one example, the MSMS communication device may be a dual-SIM-dual-standby ("DSDS") communication device, which may include two SIM cards/subscriptions that may both be active on standby, but one is deactivated when the other one is in use. In another example, the MSMS communication device may be a triple-SIM-triple-standby ("TSTS") communication device, which includes three SIM cards/subscriptions that may all be active on standby, where two may be deactivated when the third one is in use. In other examples, the MSMS communication device may be other suitable multi-SIM communication devices, with, for example, four or more SIMs, such that when one is in use, the others may be deactivated.

Further, a UE that includes a plurality of SIMs and connects to two or more separate mobile networks using two or more separate sets of RF resources is termed a multi-SIM-multi-active ("MSMA") communication device. An example MSMA communication device is a dual-SIM-dual-active ("DSDA") communication device, which includes two SIM cards/subscriptions, each associated with a separate RAT, where both SIMs may remain active at any given time. In another example, the MSMA device may be a triple-SIM-triple-active ("TSTA") communication device, which includes three SIM cards/subscriptions, each associated with a separate RAT, where all three SIMs may remain active at any given time. In other examples, the MSMA communication device may be other suitable multi-SIM communication devices, with, for example, four or more SIMs, such that all SIMs are active at any given time.

In addition, a plurality of modes are enabled by one SIM, such that each mode may correspond to a separate RAT. Such a SIM is a multi-mode SIM. A UE may include one or more multi-mode SIMs. The UE may be a MSMS communication device (such as, but not limited to, a DSDS or a TSTS communication device), a MSMA communication device (e.g., a DSDA, TSTA communication device, or the like), or a multi-mode device.

As used herein, UE refers to one of a cellular telephone, smart phone, personal or mobile multi-media player, personal data assistant, laptop computer, personal computers, tablet computer, smart book, palm-top computer, wireless electronic mail receiver, multimedia Internet-enabled cellular telephone, wireless gaming controller, and similar personal electronic device that include one or more SIMs, a programmable processor, memory, and circuitry for connecting to one or more mobile communication networks (simultaneously or sequentially). Various embodiments may be useful in mobile communication devices, such as smart phones, and such devices are referred to in the descriptions of various embodiments. However, the embodiments may be useful in any electronic device, such as a DSDS, a TSTS, a DSDA, a TSTA communication device (or other suitable multi-SIM, multi-mode devices), that may individually maintain one or more subscriptions that utilize one or a plurality of separate set of RF resources.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the UE to establish a communication link for a particular communication service with a particular network, the term "SIM" may also be used herein as a shorthand reference to the communication service associated with and enabled by the information (e.g., in the form of various parameters) stored in a particular SIM as the SIM and the communication network, as well as the services and subscriptions supported by that network, correlate to one another.

Embodiments described herein are directed to improving the recovery of information bits from downlink frames when increased symbol loss occurs due to portions of downlink frames being entirely lost.

With reference to FIG. 1, a schematic diagram of a system 100 is shown in accordance with various embodiments. The system 100 may include a UE 110, a first base station 120, and a second base station 130. In some embodiments, each of the first base station 120 and the second base station 130 may represent a separate RAT, such as GSM, CDMA, CDMA2000, TD-CDMA, TD-SCDMA, W-CDMA, TDMA, FDMA, LTE, etc. In other words, the first base station 120 may represent a first RAT, and the second base station may represent a second RAT, where the first RAT and the second RAT are different RATs. By way of illustrating with a non-limiting example, the first base station 120 may be transmitting W-CDMA while the second base station 130 may be transmitting GSM. In some embodiments, each RAT may be transmitted by the associated base station at different physical locations (i.e., the first base station 120 and the second base station 130 may be at different locations). In other embodiments, each RAT may be transmitted by the associated base station at the same physical location (i.e., the first base station 120 and the second base station 130 may be physically joined, or the base stations are the same base station).

The first base station 120 and the second base station 130 may each include at least one antenna group or transmission station located in the same or different areas, where the at least one antenna group or transmission station may be associated with signal transmission and reception. The first base station 120 and the second base station 130 may each include one or more processors, modulators, multiplexers, demodulators, demultiplexers, antennas, and the like for performing the functions described herein. In some embodiments, the first base station 120 and the second base station 130 may be utilized for communication with the UE 110 and may be an access point, Node B, evolved Node B (eNode B or eNB), base transceiver station (BTS), or the like.

A cell 140 may be an area associated with the first base station 120 and the second base station 130, such that the UE 110, when located within the cell 140, may connect to or otherwise access both the first and second RATs, as supported by the first base station 120 and the second base station 130 (e.g., receive signals from and transmit signals to the first base station 120 and the second base station 130), respectively. The cell 140 may be a defined area, or may refer to an undefined area in which the UE 110 may access the RATs supported by the base stations 120, 130.

In various embodiments, the UE 110 may be configured to access the RATs from the first base station 120 and/or the second base station 130 (e.g., receive/transmit signals of the first and/or the second RAT from/to the first base station 120 and/or the second base station 130). The UE 110 may be configured to access the RATs by virtue of the multi-SIM and/or the multi-mode SIM configuration of the UE 110 as described, such that when a SIM corresponding to a RAT is received, the UE 110 may be allowed to access that RAT, as provided by the associated base station.

In general, an acquisition process of a RAT refers to the process in which the UE 110 searches and acquires various communication protocols of the RAT in order to acquire and establish communication or traffic with the target base node that is broadcasting the RAT. Some communication protocols include synchronization channels, such as, but not limited to, primary synchronization channel ("P-SCH"), secondary synchronization channel ("S-SCH"), common pilot channel ("CPICH"), and the like. The target base nodes are nodes that transmit, broadcast, or otherwise support the particular RAT being acquired. In some embodiments, the first base station 120 may be a target base node for the first RAT, given that the first RAT may be transmitted by the first base station 120 as described. Thus, when the UE 110 initiates an acquisition process of the first RAT (as supported by the first base station 120), a communication channel is set for future communication and traffic between the UE 110 and the first base station 120. Similarly, the second base station 130 may be a target base node for the second RAT, which is transmitted by the second base station 130 as described. Thus, when the UE 110 initiates an acquisition process of the second RAT, a communication channel is set for future communication and traffic between the UE 110 and the second base station 130. The acquisition process may be initiated when the UE 110 seeks to initially access the RAT, or, after attaching to an initial RAT, to identify candidate target RAT (that is not the initial RAT) for a handover.

It should be appreciated by one of ordinary skill in the art that FIG. 1 and its corresponding disclosure are for illustrative purposes, and that the system 100 may include three or more base stations. In some embodiments, three or more base stations may be present, where each of the three or more base stations may represent (i.e., transmits signals for) one or more separate RATs in the manner such as, but not limited to, described herein.

Figure 2:
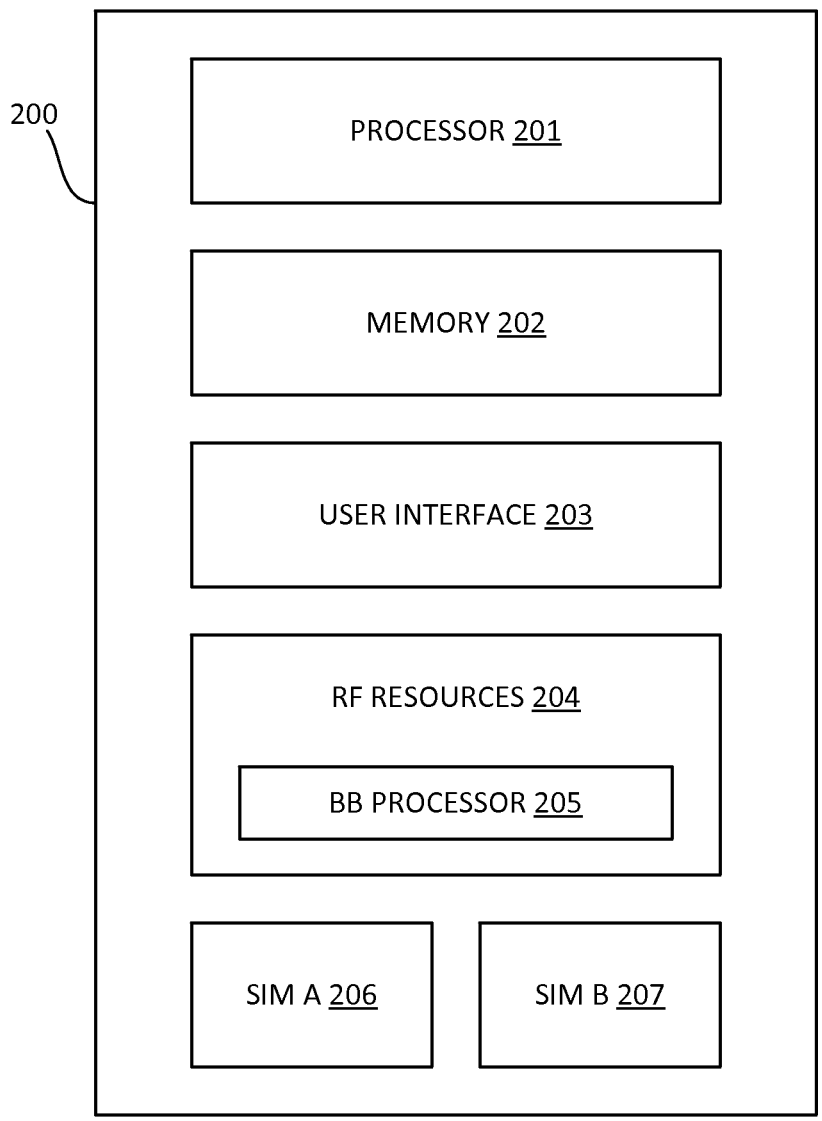
FIG. 2 is a functional block diagram illustrating an example of a user equipment according to various embodiments.

FIG. 2 is a functional block diagram of a UE 200 suitable for implementing various embodiments. According to various embodiments, the UE 200 may be the same or similar to the UE 110 as described with reference to FIG. 1. With reference to FIGS. 1 and 2, the UE 200 may include at least one processor 201, memory 202 coupled to the processor 201, a user interface 203, RF resources 204, and one or more SIMs (as denoted SIM A 206 and SIM B 207).

The processor 201 may include any suitable data processing device, such as a general-purpose processor (e.g., a microprocessor), but in the alternative, the processor 201 may be any suitable electronic processor, controller, microcontroller, or state machine. The processor 201 may also be implemented as a combination of computing devices (e.g., a combination of a DSP and a microprocessor, a plurality of microprocessors, at least one microprocessor in conjunction with a DSP core, or any other such configuration). The memory 202 may be operatively coupled to the processor 201 and may include any suitable internal or external device for storing software and data for controlling and use by the processor 201 to perform operations and functions described herein, including, but not limited to, random access memory RAM, read only memory ROM, floppy disks, hard disks, dongles or other USB connected memory devices, or the like. The memory 202 may store an operating system ("OS"), as well as user application software and executable instructions. The memory 202 may also store application data, such as an array data structure.

The user interface 203 may include a display and a user input device. In some embodiments, the display may include any suitable device that provides a human-perceptible visible signal, audible signal, tactile signal, or any combination thereof, including, but not limited to a touchscreen, LCD, LED, CRT, plasma, or other suitable display screen, audio speaker or other audio generating device, combinations thereof, and the like. In various embodiments, the user input device may include any suitable device that receives input from the use, the user input device including, but not limited to one or more manual operator (such as, but not limited to a switch, button, touchscreen, knob, slider or the like), microphone, camera, image sensor, and the like.

The processor 201 and the memory 202 may be coupled to the RF resources 204. In some embodiments, the RF resources 204 may be one set of RF resources such that only one RAT may be supported by the set of RF resources at any given time. In other embodiments, the RF resources may be a plurality of sets of RF resources, such that each set may support one RAT at a given time, thus enabling the UE 200 to support multiple RATs simultaneously (e.g., in a MSMA case). The RF resources 204 may include at least one baseband-RF resource chain with which each SIM in the UE 200 (e.g., the SIM A 206 and the SIM B 207) may be associated. The baseband-RF resource chain may include a baseband modem processor 205, which may perform baseband/modem functions for communications on at least one SIM, and may include one or more amplifiers and radios. In some embodiments, baseband-RF resource chains may share the baseband modem processor 205 (i.e., a single device that performs baseband/modem functions for all SIMs on the UE 200). In other embodiments, each baseband-RF resource chain may include physically or logically separate baseband processors 205.

The RF resources 204 may include transceivers that perform transmit/receive functions for the associated SIM of the UE 200. The RF resources 204 may include separate transmit and receive circuitry, such as a separate transmitter and receiver, or may include a transceiver that combines transmitter and receiver functions. The RF resources 204 may each be coupled to a wireless antenna.

In some embodiments, the processor 201, the memory 202, and the RF resources 204 may be included in the UE 200 as a system-on-chip. In some embodiments, the one or more SIMs (e.g., SIM A 206 and SIM B 207) and their corresponding interfaces may be external to the system-on-chip. Further, various input and output devices may be coupled to components on the system-on-chip, such as interfaces or controllers.

The UE 110 is configured to receive one or more SIMs (e.g., SIM A 206 and SIM B 207), an example of which is described herein. A SIM in various embodiments may be a Universal Integrated Circuit Card (UICC) that is configured with SIM and/or USIM applications, enabling access to various RAT networks as described. The UICC may also provide storage for a phone book and other applications. Alternatively, in a CDMA network, a SIM may be a UICC removable user identity module (R-UIM) or a CDMA subscriber identity module (CSIM) on a card. A SIM card may have a CPU, ROM, RAM, EEPROM and I/O circuits. An Integrated Circuit Card Identity (ICCID) SIM serial number may be printed on the SIM card for identification. However, a SIM may be implemented within a portion of memory of the UE 200, and thus need not be a separate or removable circuit, chip or card.

A SIM used in various embodiments may store user account information, an IMSI, a set of SIM application toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

In some embodiments, the UE 200 may include a first SIM interface (not shown) that may receive a first SIM (e.g., SIM A 206), which may be associated with one or more RATs. In addition, the UE 200 may also include a second SIM interface (not shown) that may receive a second SIM (e.g., SIM B 207), which may be associated with one or more RATs that may be different (or the same in some cases) than the one or more RATs associated with SIM A 206. Each SIM may enable a plurality of RATs by being configured as a multi-mode SIM, as described herein. In some embodiments, a first RAT enabled may be a same or different RAT as a second RAT (e.g., a DSDS device may enable two RATs) where both of them may be GSM, or one of them may be GSM and the other may be W-CDMA. In addition, two RATs (which may be the same or different) may each be associated with a separate subscription, or both of them may be associated with a same subscription. For example, a DSDS device may enable LTE and GSM, where both of the RATs enabled may be associated with a same subscription, or, in other cases, LTE may be associated with a first subscription and GSM may be associated with a second subscription different from the first subscription.

In embodiments in which the UE 200 comprises a smart phone, mobile phone device, or the like, the UE 200 may have existing hardware and software for telephone and other typical wireless telephone operations, as well as additional hardware and software for providing functions as described herein. Such existing hardware and software includes, for example, one or more input devices (such as, but not limited to keyboards, buttons, touchscreens, cameras, microphones, environmental parameter or condition sensors), display devices (such as, but not limited to electronic display screens, lamps or other light emitting devices, speakers or other audio output devices), telephone and other network communication electronics and software, processing electronics, electronic storage devices and one or more antennae and receiving electronics for receiving various RATs. In such embodiments, some of that existing electronics hardware and software may also be used in the systems and processes for functions as described herein.

Accordingly, such embodiments can be implemented with minimal additional hardware costs. However, other embodiments relate to systems and process that are implemented with dedicated device hardware (UE 200) specifically configured for performing operations described herein. Hardware and/or software for the functions may be incorporated in the UE 200 during manufacturing, for example, as part of the original equipment manufacturer's ("OEM's") configuration of the UE 200. In further embodiments, such hardware and/or software may be added to the UE 200, after manufacturing of the UE 200, such as by, but not limited to, installing one or more software applications onto the UE 200.

In some embodiments, the UE 200 may include, among other things, additional SIM(s), SIM interface(s), additional RF resource(s) (i.e., sets of RF resources) associated with the additional SIM(s), and additional antennae for connecting to additional RATs supported by the additional SIMs.

Embodiments may be implemented in a UE that performs tune-away or other similar procedures to support communication with multiple RATs. In particular, embodiments may be implemented in a UE capable of concurrently communicating with more than one RAT on a single RF chain (i.e., a single receiver/transmitter module). For example, a UE may be configured to communicate with both the AT&T W-CDMA network and the Verizon CDMA2000 network.

Figure 3:
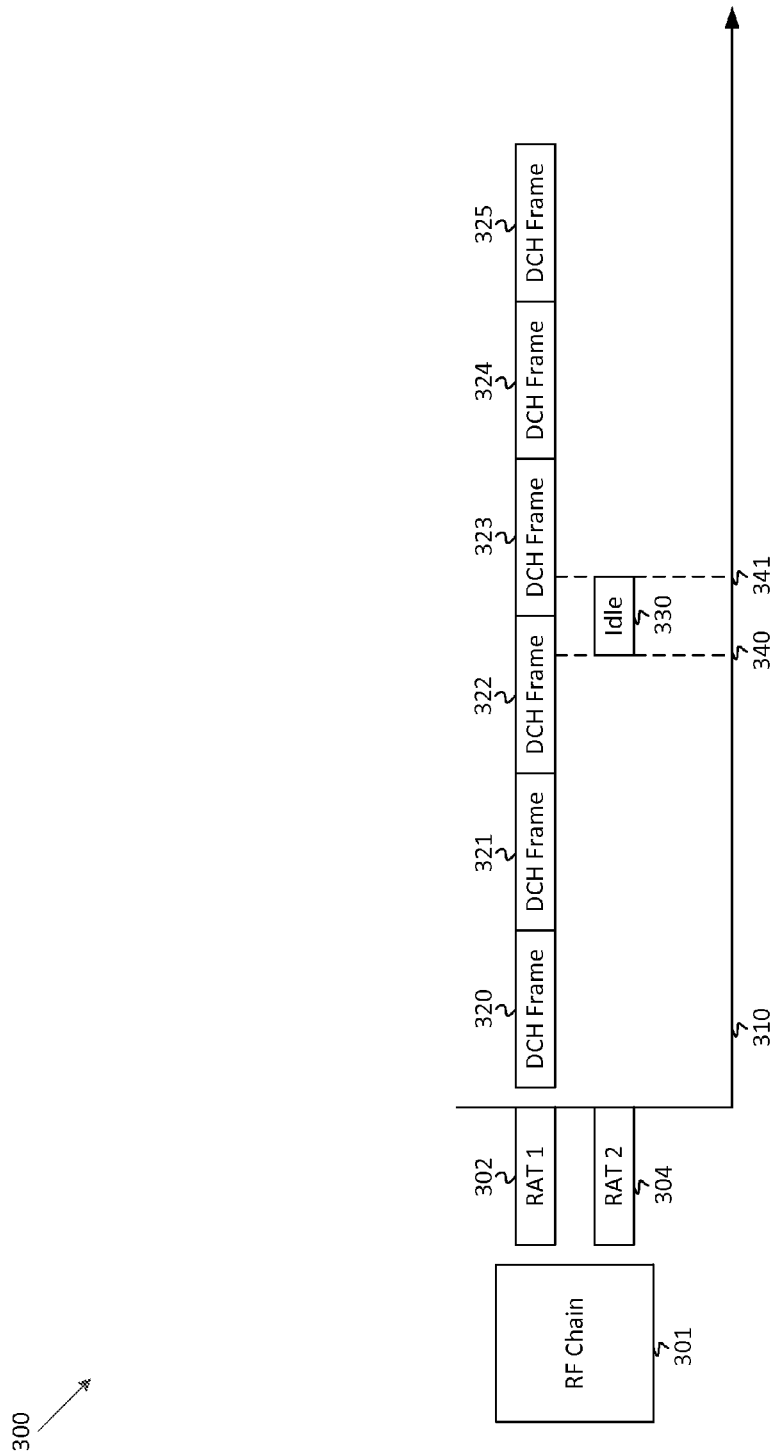
FIG. 3 is a schematic diagram illustrating a communications scenario with tune-away according to various embodiments.

FIG. 3 is a schematic diagram 300 illustrating a communications scenario with tune-away according to various embodiments. An RF chain 301 is shown. With reference to FIGS. 1-3, the RF chain 301 may be a receiver/transmitter module provided in a UE device (e.g., 110, 200), such as in the RF resources 204. RAT 1 302 and RAT 2 304 are shown, indicating that the UE can communicate using RAT 1 302 and RAT 2 304. In particular, the UE may use the single RF chain 301 to perform communications on both RAT 1 302 and RAT 2 304.

The UE may need to perform a tune-away of RF chain 301 as shown on timeline 310. For example, the UE may be in a connected mode on a first network using RAT 1 302. The UE may be performing a voice call using RAT 1 302 on a dedicated transport channel ("DCH"). As such, the UE may be using the RF chain 301 to receive downlink DCH frames 320, 321, 322, 323, 324, and 325 from a base station transmitting those frames for RAT 1 302. At the same time, the UE may not be in a connected mode on a second network using RAT 2 304. Nonetheless, the UE may still need to perform some idle mode activities on the second network, such as monitoring the paging channel. For example, the UE may tune the RF chain 301 to RAT 2 302 in order to receive idle signal 330, such as a paging signal. In this way, the shared RF chain has been tuned away from RAT 1 302 and to RAT 2 304 for a short period of time.

The tune-away procedure may be limited to a brief period of time, such as between time 340 and time 341. The period of time between time 340 and time 341 in which the tune-away procedure is performed may be referred to as the tune-away period. Note that the timeline 310 shows time progressing from left to right in the illustration. While the RF chain 301 is tuned to RAT 2 304, a portion of DCH frame 322 (a portion towards the end) and a portion of DCH frame 323 (a portion towards the beginning) may be lost by the UE. Namely, the RF chain 301 may not be actively receiving signals from RAT 1 302, so any signals transmitted by the base station for RAT 1 302 that arrive at the UE between time 340 and time 341 may not be demodulated, decoded, etc. as required to successfully receive the data symbols contained in those portions of DCH frames 322 and 323. In this way, those portions of the DCH frames 322 and 323 and the symbols contained therein may be lost by the UE even though they are transmitted normally by the base station for RAT 1 302. In this way, the tune-away procedure may cause a degradation of performance for the DCH channel of RAT 1 302, given that symbols arriving at the UE on the DCH channel of RAT 1 302 during the tune-away procedure may not be received.

Embodiments may be implemented in a UE that communicates using a RAT that allows for variable downlink transmission power. In particular, in such RATs, the base station may be able to change the transmission power for transmissions from the base station to the UE. The UE may be able to affect this downlink transmission power by sending transmit power control ("TPC") commands to the base station. TPC commands are simple in form, instructing the base station to simply step the power up or step the power down on the downlink transmissions directed to the UE. TPC commands are typically much shorter than data frames, allowing anywhere from 10 to 15 TPC commands to be sent during the duration of receiving a single data frame. For example, many CDMA cellular technologies, such as W-CDMA and CDMA2000 use variable downlink transmission power schemes.

In order to implement this power control mechanism, the UE may perform both an "inner loop" power control process and an "outer loop" power control process. These two loops are connected by a signal-to-interference ratio target ("SIR target") value maintained by the UE. The SIR target specifies the ideal SIR for the downlink. The SIR target may be referred to as the $E_s/N_t$ target, signal-to-noise ratio target, SNR target, $E_b/N_0$ target, or otherwise in various contexts. The inner loop (or "closed loop" in some contexts) is typically executed at very short intervals. For the inner loop, the actual SIR of the downlink is compared to the SIR target. If the actual SIR is lower than the SIR target, then a TPC command for increased transmit power is sent to the base station. If the actual SIR is higher than the SIR target, then a TPC command for decreased transmit power is sent to the base station.

The outer loop is typically executed on a less frequent basis (e.g., once per frame period). For the outer loop, data block errors are detected based on a metric, such as a cyclic redundancy check ("CRC"). A CRC error rate may be preferred to be maintained in the range of 1% to 5%. However, other suitable ranges may be implemented. If an unacceptably high CRC error rate occurs (i.e., exceeds the range), then the SIR target is increased. If an unacceptably low CRC error rate occurs (i.e., is outside the range), then the SIR target is decreased. This modification of the SIR target then affects the likelihood of increase and decrease TPC commands during execution of the inner loop. In this way, the outer loop provides feedback control to the inner loop using the SIR target.

Figure 4:
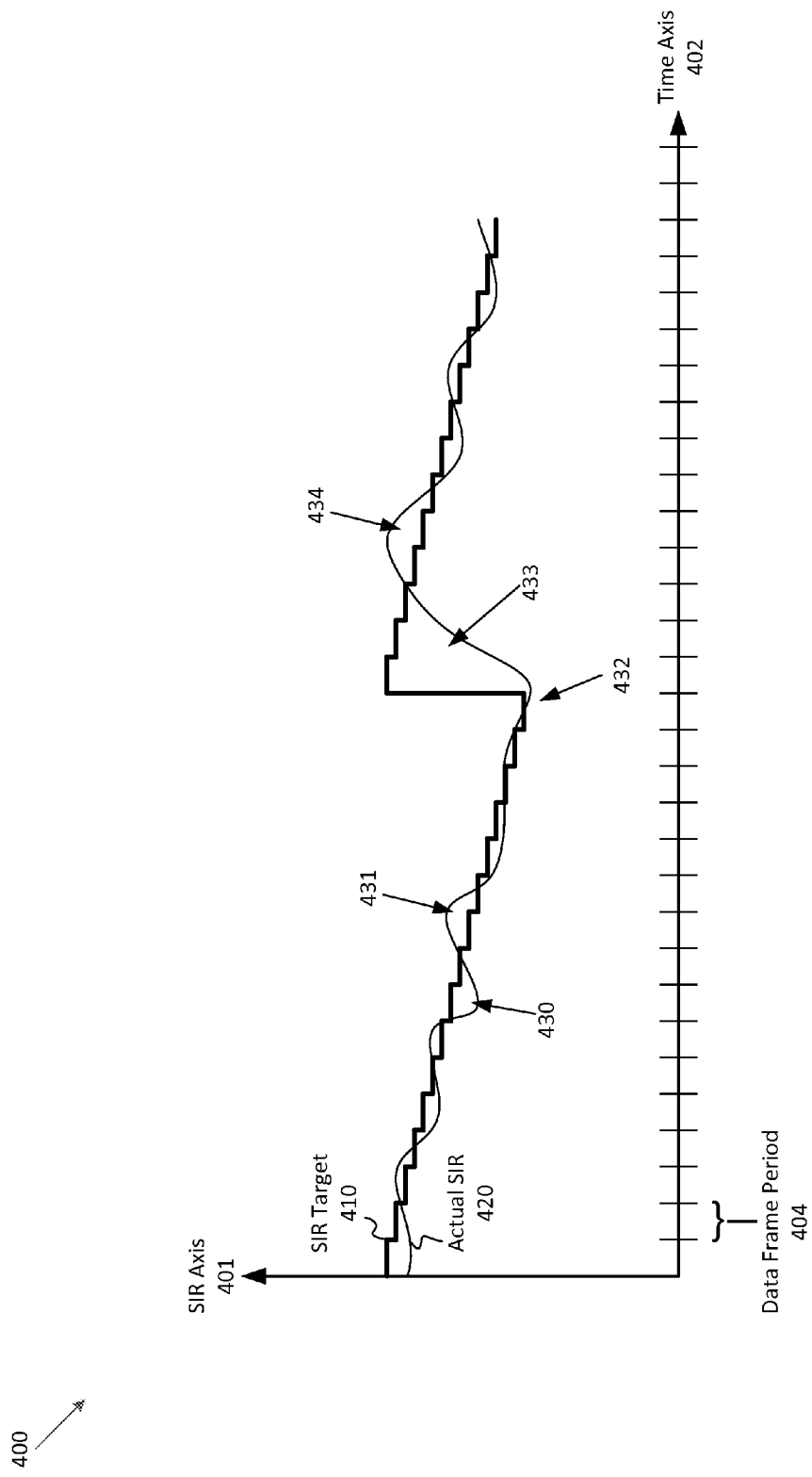
FIG. 4 is a schematic diagram illustrating a communications scenario with downlink power control according to various embodiments.

FIG. 4 is a schematic diagram 400 illustrating a communications scenario with downlink power control according to various embodiments. FIG. 4 shows various downlink power control features described. A SIR axis 401 and time axis 402 are shown. With reference to FIGS. 1-4, the length of a data frame is indicated by data frame period 404. A SIR target 410 maintained by the UE is shown. The SIR target 410 may be modified in the step-like fashion shown. Namely, the SIR target 410 may be decreased by a small fixed increment every frame period. Then, around time 432, when an unacceptably high CRC error rate occurs, the SIR target 410 may be increased by a larger value. The step-wise decrease of the SIR target 410 then resumes. An actual SIR 420 as measured by the UE is shown. While variation of the actual SIR 420 from the SIR target 410 is somewhat exaggerated in this illustration, the actual SIR 420 demonstrates that the actual SIR value may vary above and below the SIR target 410 at any point in time. At times 430 and 433, the actual SIR 420 is below the SIR target 410. As such, the UE may transmit TPC commands for increased downlink transmit power to the base station during times 430 and 433. At times 431 and 434, the actual SIR 420 is above the SIR target 410. As such, the UE may transmit TPC commands for decreased downlink transmit power to the base station during times 431 and 434.

Figure 5:
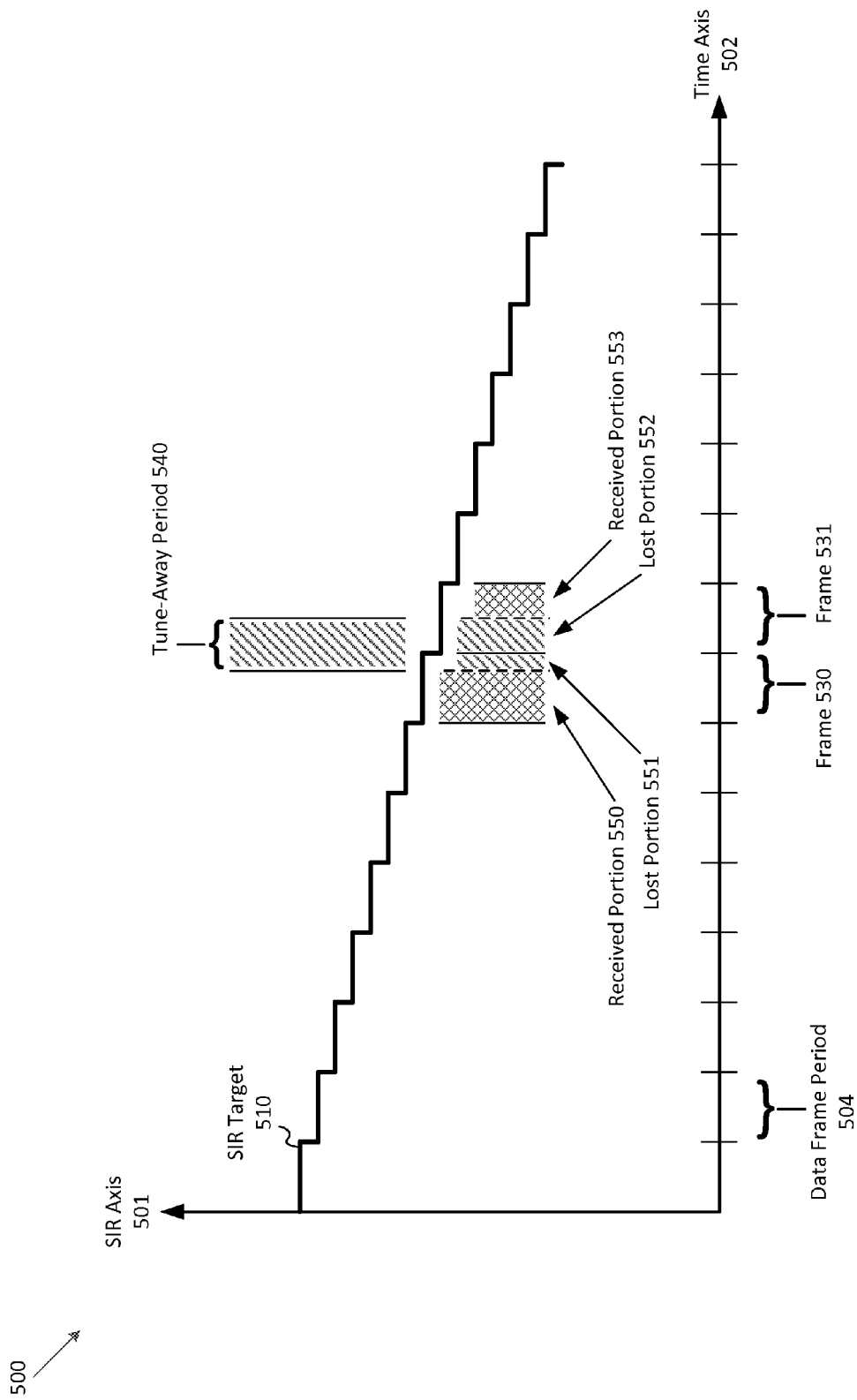
FIG. 5 is a schematic diagram illustrating a communications scenario according to various embodiments.

FIG. 5 is a schematic diagram 500 illustrating a communications scenario according to various embodiments. A SIR axis 501, time axis 502, SIR target 510, and data frame period 504 are shown. These elements are similar to those shown in FIG. 4, however the scale is different between these two figures (note the difference in relative length of data frame periods 404 and 504). With reference to FIGS. 1-5, based on a tune-away period 540, it can be seen that two frames 530 and 531 overlap with the tune-away period 540. In particular, the frames 530 and 531 may be frames from a first RAT, while the tune-away period 540 indicates a period of time for which a shared RF chain will be tuned away to a second RAT.

Because portions of the frames 530 and 531 overlap with the tune-away period 540, portions of the frames 530 and 531 may be lost. In particular, the frame 530 may include a received portion 550 and a lost portion 551. The frame 531 may include a lost portion 552 and a received portion 553. The lost portions 551 and 552 overlap with the tune-away period 540, so the symbols arriving at the UE during those frame portions may not be received by the UE. However, the received portions 550 and 553 do not overlap with the tune-away period 540, so the symbols arriving at the UE during those frame portions will be received normally by the UE.

As illustrated in this figure, the tune-away period 540 is not necessarily synced in any way to the frame periods for the first RAT to which the frames 530 and 531 belong. Instead, the timing of the tune-away period 540 may be determined based on a paging schedule or some other requirement of the second RAT, so that it may not be possible to schedule the tune-away period 540 to align with frame periods of the first RAT. As further shown, the tune-away period 540 may overlap multiple frames, shown here overlapping frames 530 and 531. However, in some instances, a tune-away period may overlap only one frame. In other instances, a tune-away period may overlap more than two frames. Nonetheless, it is expected that a tune-away period will generally only overlap one or two frames.

While the tune-away period 540 is shown as having a clear start time and end time, it may be possible to know the start time of a tune-away period in advance but not know the end time of a tune-away period in advance. For example, the tune-away period 540 may be scheduled based on a recurring fixed interval, depending on some characteristic of the second RAT. As such, the precise start time of the tune-away period 540 may be known in advance. However, the paging or other activities performed for the second RAT during the tune-away period 540 may not have a predetermined duration. As such, the precise end time of the tune-away period 540 may not be known in advance. Instead, the end time of the tune-away period 540 may not be known until the tune-away period 540 actually ends. However, this termination of the tune-away period 540 may be easily observed by the UE when the termination of tune-away period 540 occurs.

Figure 6:
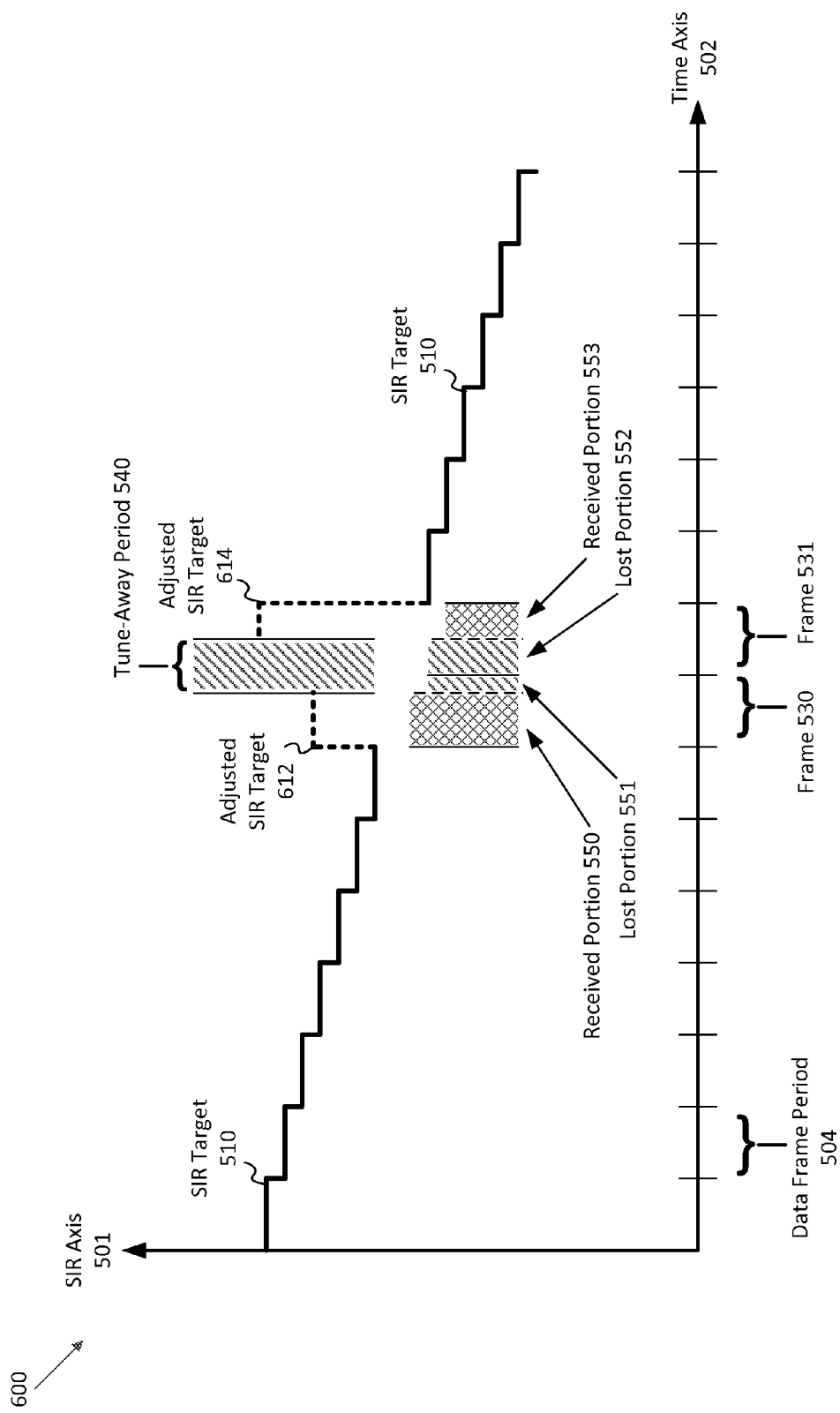
FIG. 6 is a schematic diagram illustrating a communications scenario according to various embodiments.

FIG. 6 is a schematic diagram 600 illustrating a communications scenario according to various embodiments. Diagram 600 shows various features from FIG. 5. However, diagram 600 shows a technique for adjusting the SIR target value maintained by the UE. With reference to FIGS. 1-6, in particular, the SIR target 510 is shown as used for all frame periods other than the frames 530 and 531. However, during the frames 530 and 531, adjusted SIR target 612 and 614 are used as the SIR target value by the UE. These increased values for the SIR target value may cause the UE to transmit to the base station more TPC commands for increased downlink transmit power than would otherwise be sent using the standard SIR target 510. In this way, the transmit power for the received portion 550 and the received portion 553 may be higher than would exist using the standard SIR target 510. Thus, using this technique the UE may cause the transmit power of the base station to be increased for the frame portions that will be received.

Using this power control technique, the UE may be able to fully or partially compensate for the symbols lost during the lost portions 551 and 552 by having a higher signal quality and thus higher accuracy of symbol recovery during the received portions 550 and 553. Namely, the higher transmit power for the received portions 550 and 553 (as compared to the transmit power using the standard SIR target 510) may reduce symbol errors for the received portions 550 and 553 of the frames 530 and 531, thereby compensating for the symbol errors caused by the lost portions of the frames. Due to any block coding of information bits into the transmitted symbols and error correction techniques already in use, this approach may allow all or at least more of the original information bits to be recovered even though some portions of the frames along with their transmitted symbols are completely lost.

The adjusted SIR target 612 may be used beginning with the start of the frame 530. The adjusted SIR target 612 may be used instead of the SIR target 510 based on determining that the frame 530 will be affected by the tune-away period 540.

While a variety of values may be used for the adjusted SIR target 612, one example is now explained for setting the adjusted SIR target 612 to be proportional to the percentage of the frame 530 that will be received. As stated above, the start time for the tune-away period 540 may be known in advance. The start time and end time for the frame 530 may also be known in advance. While the UE may not know the end time of the tune-away period 540 in advance, the UE may have an estimate of a common duration for the length of the tune-away period 540. For example, the UE may be configured to use 7.5 ms as a default expected duration for the tune-away period 540. A frame period of 10 ms for the data frame period 504 may be used. A known starting time of 7.5 ms after the start of the frame 530 may be used as the predetermined start time for the tune-away period 540. Therefore, it is expected in advance that 25% of the frame 530 may be lost (lost portion 551) and 75% of the frame 530 will be received (received portion 550).

Using this information, the following relationship may be used to set the adjusted SIR target 612: {adjusted SIR target}×{duration of received portion}={standard SIR target}×{data frame period}. With such a relationship, the total transmit power that would ordinarily be used over the duration of a full frame period (data frame period 504) is instead used over the shortened period of the received portion of the frame (received portion 550). Based on the example discussed above, the following could be calculated: {adjusted SIR target}×{7.5 ms}={1}×{10 ms}, where a standard of 1 unit is used for the standard SIR target. This produces a value of 4/3 for the adjusted SIR target, which indicates that the value of the adjusted SIR target 612 should be 4/3 the value of the SIR target 510 that would otherwise be used for the frame 530. In some cases, it might be more useful to calculate a decibel value to express the relative value of the adjusted SIR target 612 compared to the SIR target 510. This may be calculated using the formula above as: {adjusted SIR target/standard SIR target} dB=$10 \times \log_{10}$({data frame period}/{duration of received portion}). With the present example, this would yield a 1.25 dB increase from the standard SIR target 510 to the adjusted SIR target 612.

The adjusted SIR target 614 may be used beginning with the end of the tune-away period 540 during the frame 531. The adjusted SIR target 614 may be used instead of the SIR target 510 based on determining that the frame 531 has been affected by the tune-away period 540.

While a variety of values may be used for the adjusted SIR target 614, one example is now explained for setting the adjusted SIR target 614 to be proportional to the percentage of the frame 531 that will be received. As stated above, the end time for tune-away period 540 may not be known in advance. Therefore, the adjusted SIR target 614 may not be set until immediately after the tune-away period 540 ends. The start time and end time for the frame 531 may be known. A known ending time of 5.0 ms after the start of the frame 531 may be used as the observed end time for the tune-away period 540. Therefore, it is known that 50% of the frame 531 has been lost (lost portion 552) and 50% of the frame 531 will be received (received portion 553).

Using this information, a similar calculation as described for the adjusted SIR target 612 may be used in order to set the adjusted SIR target 614. This may be calculated using the formula above as: {adjusted SIR target/standard SIR target} dB=$10 \times \log_{10}$({data frame period}/{duration of received portion}). With the present example, this would yield a 3.01 dB increase from the standard SIR target 510 to the adjusted SIR target 614.

Thus, in some embodiments, once the last frame (frame 531) affected by the tune-away period 540 has ended, the adjusted SIR target 614 may be removed and the standard SIR target 510 may be used.

In some embodiments, the techniques described may be applied to a situation where a tune-away period is expected to overlap only a single frame. For example, if the tune-away period is scheduled to start at 0.5 ms from the beginning of a frame, the expected duration for tune-away is configured to be 10 ms, and the frame period is 20 ms, then the tune-away period may be expected to cause loss of 50% of the frame. As such, an adjusted SIR target of 3 dB increase over the standard SIR target may be used from the start of the frame to the start of the tune-away period. Then, the adjusted SIR target value may be recalculated when the tune-away period ends as described above, in case the tune-away period lasts more or less than 10 ms.

In some embodiments, the techniques described may be applied to a situation where a tune-away period is expected to begin at the very beginning of a frame. In such a case, the UE may determine to not set an adjusted SIR target value prior to the tune-away period. Instead, the UE may determine to only set an adjusted SIR target value after the tune-away period ends as described above.

Figure 7:
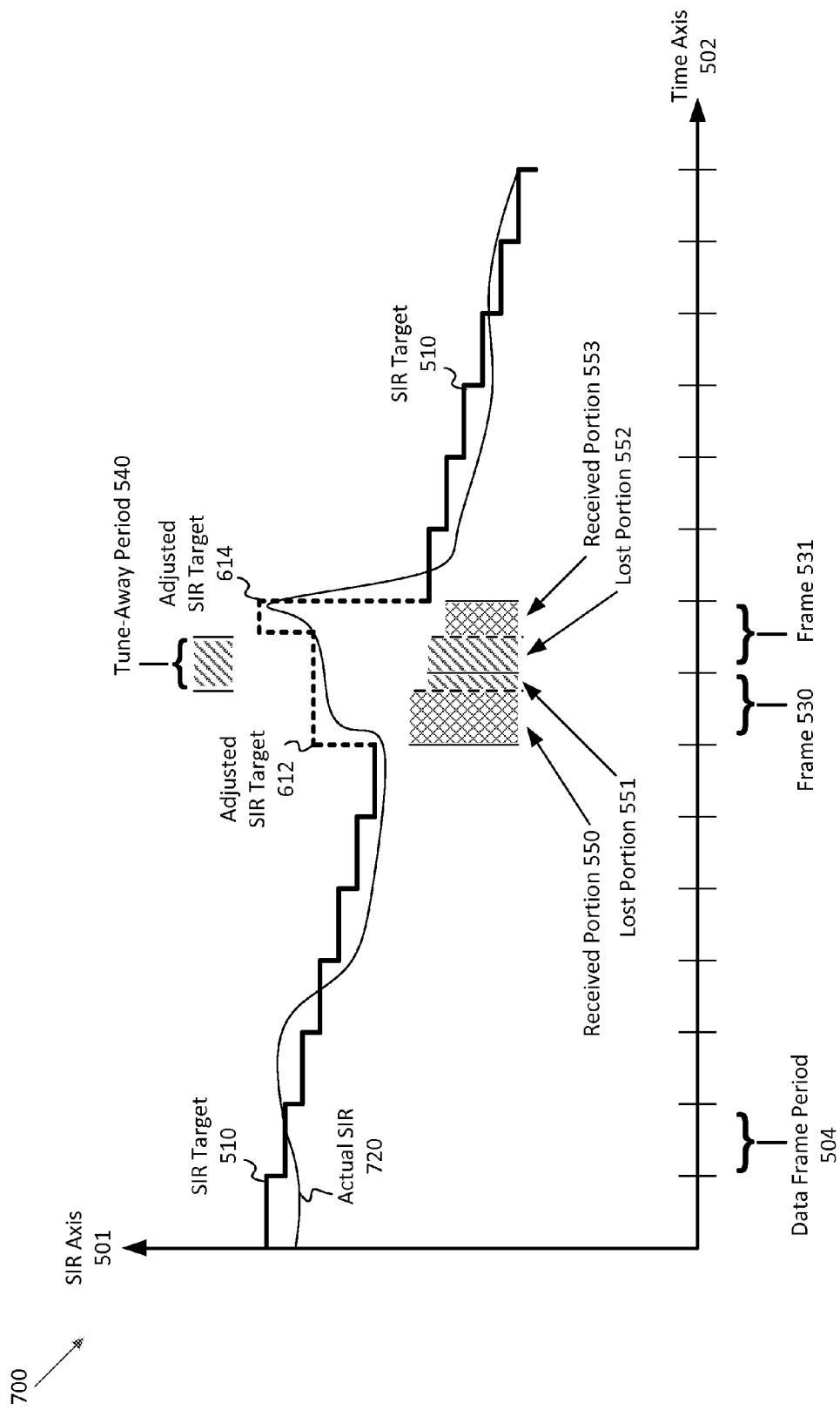
FIG. 7 is a schematic diagram illustrating a communications scenario according to various embodiments.

FIG. 7 is a schematic diagram 700 illustrating a communications scenario according to various embodiments. Diagram 700 includes various features of diagram 600. However, diagram 700 additionally shows actual SIR 720 that may result from using the techniques described with respect to the previous figures.

With reference to FIGS. 1-7, the actual SIR 720 may vary above and below the SIR target 510 much as described with respect to the actual SIR 420 (e.g., FIG. 4). However, where the adjusted SIR targets 612 and 614 are used during the frames 530 and 531 instead of the standard SIR target 510, the actual SIR 720 may increase over what would otherwise be the level of the SIR target 510. This may occur due to the UE sending more TPC commands to the base station during the frames 530 and 531 based on the adjusted SIR targets 612 and 614 than would otherwise be sent using the SIR target 510. In particular, as the frame period for the frame 530 begins, the adjusted SIR target 612 is used. At this point, the actual SIR 720 is much lower than the now increased SIR target value (adjusted SIR target 612, not SIR target 510) maintained by the UE. Therefore, the UE may transmit a sequence of TPC commands for increased transmit power to the base station starting with the beginning of the frame 530. This may continue until the actual SIR 720 approaches the adjusted SIR target 612 during the frame 530. Then, as the adjusted SIR target 614 is used instead of the adjusted SIR target 612, the UE may transmit a further sequence of TPC commands for increased transmit power to the base station. This may cause the actual SIR 720 to increase further during the received portion 553. Then, when the standard SIR target 510 is once again used after the end of the frame 531, the actual SIR 720 drops again until the actual SIR 720 approaches the SIR target 510. In this way, the actual SIR 720 has been increased for the received portions 550 and 553 as compared to what the actual SIR 720 otherwise would have been using the SIR target 510. Therefore, the benefit of reduced error rate during the received portions 550 and 553 and thus compensation for the lost symbols during the lost portions 551 and 552 as described may be achieved.

In some embodiments, the use of the adjusted SIR targets 612 and 614 may be different than that shown diagram 700. For example, diagram 700 shows that the adjusted SIR target 612 may be maintained during the duration of the tune-away period 540. In some embodiments, a gradually increasing value may be used for the adjusted SIR target beginning with the start of the frame 531. Alternatively, the adjusted SIR target 612 may be maintained until 25% of the frame 531 has been lost. This point reflects the proportional increase that resulted in the calculation of the SIR target 612. Any further frame loss after that point would be greater than that used to calculate the adjusted SIR target 612. Therefore, while the adjusted SIR target 614 may not yet be calculated, it would be known that the adjusted SIR target 614 will be higher than the adjusted SIR target 612. As such, a gradually increasing value for the adjusted SIR target 612 may be used until the end of tune-away period 540 is observed. In this way, the adjusted SIR target 612 value and actual SIR value may be closer to the level eventually calculated for the adjusted SIR target 614 once the tune-away period 540 ends.

In some embodiments, the adjusted SIR target 612 may be used prior to the beginning of the frame 530. For example, the adjusted SIR target 612 may be used beginning with the start of the prior frame period or halfway through the prior frame period. In this way, the actual SIR value may already have reached the increased value of the adjusted SIR target 612 once the frame 530 and the received portion 550 start.

In some embodiments, limits on the adjusted SIR target value may be used. For example, the UE may be configured to not set the adjusted SIR target value greater than a 10 dB (or other amount) increase over the standard SIR target value. In such cases, it may be determined that such a high adjusted SIR target value may cause unacceptable levels of interference for other UE using the first RAT, or that too much of the frame has been lost to effectively recover the information bits of that frame.

Several benefits of the described techniques can be observed. First, using the described techniques may allow improvements to performance both in terms of system capacity as well as user data throughput and latency. Second, in some embodiments, the UE may be able to perform all of the relevant steps of the technique independent of the base station. In particular, the base station for the first RAT may not be informed that the UE is performing a tune-away. Furthermore, the base station for the first RAT may not be informed that the UE is performing an adjustment to the SIR target value. In this way, the UE may be able to perform all steps of the technique without control or intervention by the base station for the first RAT. Third, in some embodiments the base station for the first RAT may be able to transmit frames in the downlink to the UE in any normal fashion that the base station would otherwise use. In particular, the base station may not need to modify anything as to the coding scheme or other symbol characteristics for the frames transmitted in the downlink to the UE. That is to say that the base station may only need to support the use of variable downlink transmission power based on feedback (such as TPC commands) from the UE, which many RAT base stations already support. Therefore, modifications to the base station to alter coding rates or schemes, such as a spreading scheme, may not be necessary to support the techniques described above. Furthermore, extensive coordination signaling between the UE and the base station to arrange the tune-away, inform the other device of the adjustment to the SIR target, and arrange other details of the technique are not necessary. In some situations, these benefits of the techniques described herein may be generalized by referring to these techniques as an "uncoordinated" approach to multi-RAT support, as opposed to techniques that involve coordination and control by the network, base station, RAT, etc.

Figure 8:
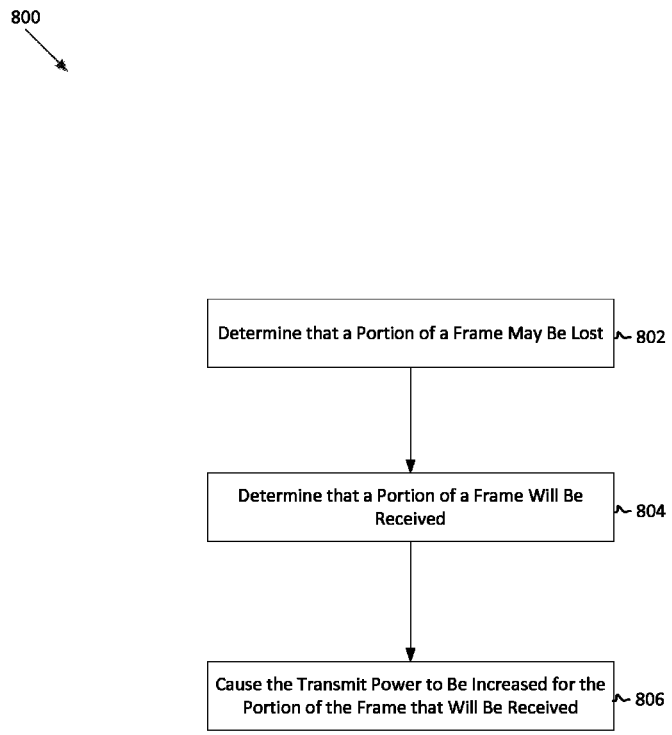
FIG. 8 is a flowchart of a process for downlink power control according to various embodiments.

FIG. 8 is a flowchart of a process 800 for downlink power control according to various embodiments. With reference to FIGS. 1-8, the process 800 may be performed by a UE (e.g., 110, 200), such as by the processor 201, the baseband processor 205, or the like.

At block 802, a determination is made that a portion of a frame may be lost. The frame may be a frame transmitted in a downlink from a base station to the UE. The frame may be a frame in a dedicated channel for a first RAT. The determination that the portion of the frame may be lost may be based on a scheduled use of a shared radio for a second RAT. The determination that the portion of the frame may be lost may be based on a scheduled tune-away. The portion of the frame that may be lost may include symbols transmitted by the base station but not successfully decoded or otherwise processed by the UE. The UE may determine that the portion of the frame may be lost, and this determination may be made independent of the base station and any coordination signaling therefrom. The determination that the portion of the frame may be lost may be based on a scheduled tune-away and an expected tune-away duration.

At block 804, a determination is made that a portion of a frame will be received. The frame may be the same frame from which a portion may be lost as determined in block 802. The frame may be a frame transmitted in a downlink from a base station to the UE. The frame may be a frame in a dedicated channel for a first RAT. The determination that the portion of the frame will be received may be based on a scheduled use of a shared radio for a second RAT. The determination that the portion of the frame will be received may be based on a scheduled tune-away. The portion of the frame that will be received may include symbols transmitted by the base station and successfully decoded or otherwise processed by the UE. The UE may determine that the portion of the frame will be received, and this determination may be made independent of the base station and any coordination signaling therefrom. The determination that the portion of the frame will be received may be based on a scheduled tune-away and an expected tune-away duration. The determination that the portion of the frame will be received may be based on the determination that a portion of the same frame may be lost. The portion of the frame that will be received and the portion of the frame that may be lost may be transmitted by the base station using the same coding rate and scheme, such as using a same spreading scheme.

At block 806, the transmit power for the portion of the frame that will be received is caused to be increased. The UE may cause the transmit power to be increased. The transmit power may be caused to be increased by adjusting a signal-to-interference ratio target value maintained by the UE. The transmit power may be caused to be increased by adjusting a signal-to-interference ratio target value proportionally to a length of the portion of the frame that will be received when compared to a total length of the frame. The transmit power may be caused to be increased by transmitting TPC commands to the base station for increased downlink transmit power. Causing the transmit power to be increased for the portion that will be received may also cause the transmit power to be increased for the portion that may be lost. Causing the transmit power to be increased for the portion that will be received may include causing the transmit power to be increased over a transmit power that would otherwise be used. The transmit power that would otherwise be used may be a transmit power that would be used based on a standard or non-adjusted signal-to-interference ratio target value maintained by the UE.

Figure 9:
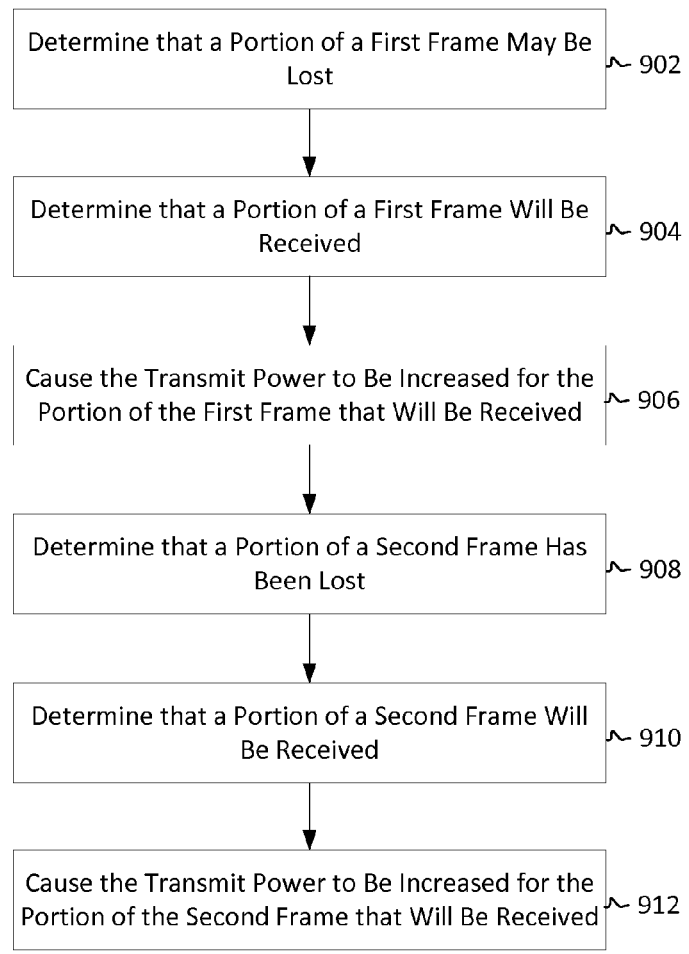
FIG. 9 is a flowchart of a process for downlink power control according to various embodiments.

FIG. 9 is a flowchart of a process 900 for downlink power control according to various embodiments. With reference to FIGS. 1-9, the process 900 may be performed by a UE (e.g., 110, 200), such as by the processor 201, the baseband processor 205, or the like.

Block 902 may be performed in any manner described with respect to block 802.

Block 904 may be performed in any manner described with respect to block 804.

Block 906 may be performed in any manner described with respect to block 806.

At block 908, a determination is made that a portion of a second frame has been lost. The second frame may be a frame transmitted in a downlink from a base station to the UE. The second frame may be a frame in a dedicated channel for a first RAT. The determination that the portion of the second frame has been lost may be based on the observation of an end of a use of a shared radio for a second RAT. The determination that the portion of the second frame has been lost may be based on the observation of an end of a tune-away. The portion of the second frame that has been lost may include symbols transmitted by the base station but not successfully decoded or otherwise processed by the UE. The UE may determine that the portion of the second frame has been lost, and this determination may be made independent of the base station and any coordination signaling therefrom.

At block 910, a determination is made that a portion of a second frame will be received. The second frame may be the same second frame from which a portion has been lost as determined in block 908. The second frame may be a frame transmitted in a downlink from a base station to a UE. The second frame may be a frame in a dedicated channel for a first RAT. The determination that the portion of the second frame will be received may be based on the observation of an end of a use of a shared radio for a second RAT. The determination that the portion of the second frame will be received may be based on the observation of an end of a tune-away. The portion of the second frame that will be received may include symbols transmitted by the base station and successfully decoded or otherwise processed by the UE. The UE may determine that the portion of the second frame will be received, and this determination may be made independent of the base station and any coordination signaling therefrom. The determination that the portion of the second frame will be received may be based on the determination that a portion of the same second frame has been lost. The portion of the second frame that will be received and the portion of the second frame that has been lost may be transmitted by the base station using the same coding rate and scheme, such as using a same spreading scheme.

At block 912, the transmit power for the portion of the second frame that will be received is caused to be increased. The UE may cause the transmit power to be increased. The transmit power may be caused to be increased by adjusting a signal-to-interference ratio target value maintained by the UE. The transmit power may be caused to be increased by adjusting a signal-to-interference ratio target value proportionally to a length of the portion of the second frame that will be received when compared to a total length of the second frame. The transmit power may be caused to be increased by transmitting TPC commands to the base station for increased downlink transmit power. Causing the transmit power to be increased for the portion that will be received may include causing the transmit power to be increased over a transmit power that would otherwise be used. The transmit power that would otherwise be used may be a transmit power that would be used based on a standard or non-adjusted signal-to-interference ratio target value maintained by the UE. The transmit power may be caused to be increased in block 912 separately of the transmit power being caused to be increased in block 906.

Figure 10:
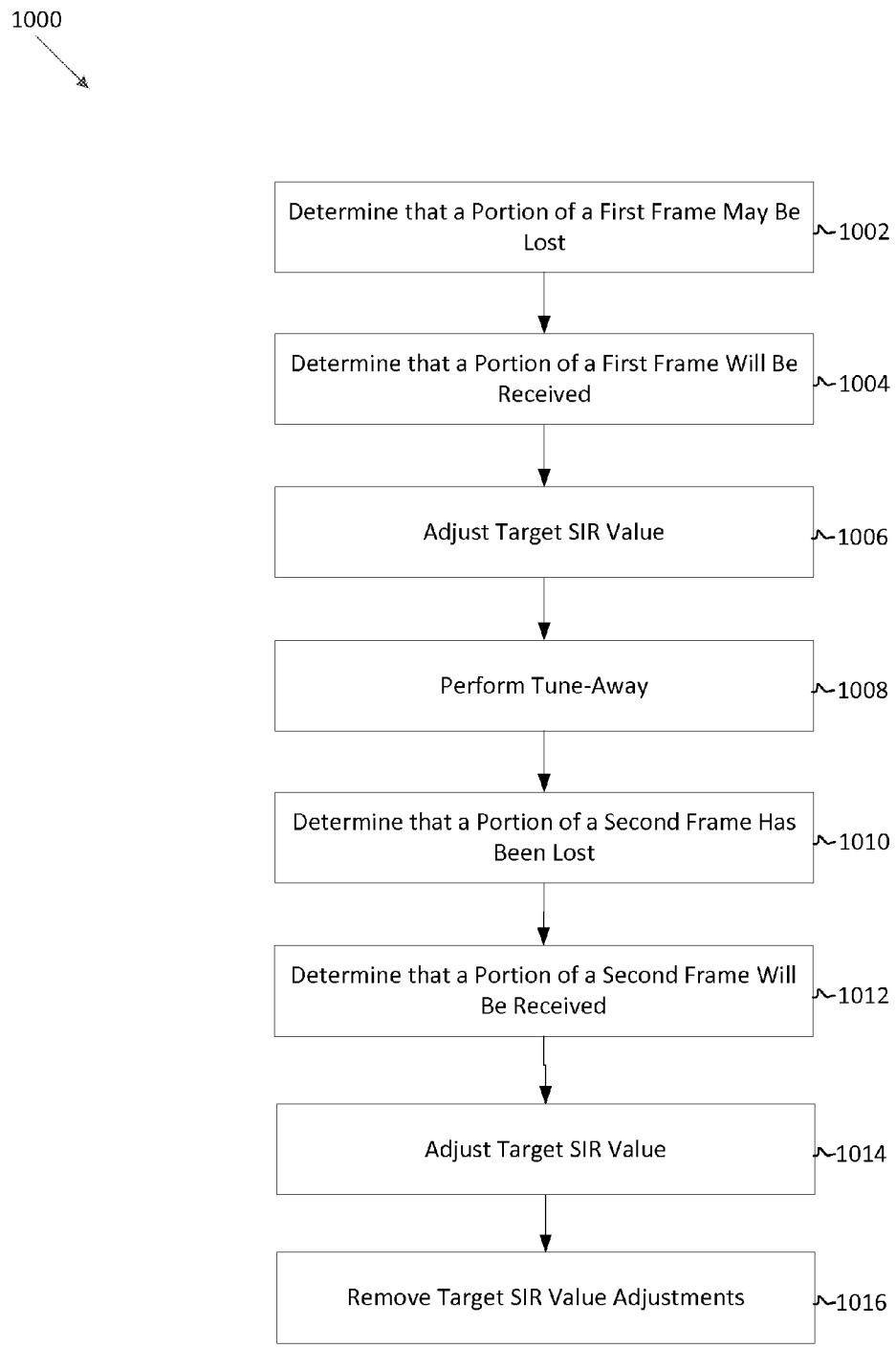
FIG. 10 is a flowchart of a process for downlink power control according to various embodiments.

FIG. 10 is a flowchart of a process 1000 for downlink power control according to various embodiments. With reference to FIGS. 1-10, the process 1000 may be performed by a UE (e.g., 110, 200), such as by the processor 201, the baseband processor 205, or the like.

At block 1002, a determination is made that a portion of a first frame may be lost. The first frame may be a frame transmitted in a downlink from a base station to a UE. The first frame may be a frame in a dedicated channel for a first RAT. The determination that the portion of the first frame may be lost may be based on a scheduled use of a shared radio for a second RAT as part of a tune-away procedure. The UE may use a scheduled tune-away start time and expected tune-away duration value in order to determine that the portion of the first frame may be lost.

At block 1004, a determination is made that a portion of the first frame will be received. The determination that the portion of the first will be received may be based on an expectation that the portion of the first frame that is not lost (as determined in block 1002) will be received.

At block 1006, a target SIR value is adjusted. The UE may increase the target SIR value that the UE maintains in order to cause more TPC commands to be transmitted to the base station for increasing the downlink transmit power, thereby increasing the signal quality for the portion of the first frame that will be received. The UE may adjust the target SIR value proportionally to the portion of the first frame that will be received.

At block 1008, a tune-away is performed.

At block 1010, a determination is made that a portion of a second frame has been lost. The second frame may be a frame transmitted in a downlink from the base station to the UE. The second frame may be a frame in a dedicated channel for a first RAT. The determination that the portion of the second frame has been lost may be based on an observation that the tune-away performed in block 1008 has ended.

At block 1012, a determination is made that a portion of a second frame will be received. The determination that the portion of the second frame will be received may be based on an expectation that the remaining portion of the second frame that has not already been lost will be received.

At block 1014, a target SIR value is adjusted. The UE may increase the target SIR value that the UE maintains in order to cause more TPC commands to be transmitted to the base station for increasing downlink transmit power, thereby increasing the signal quality for the portion of the second frame that will be received. The UE may adjust the target SIR value proportionally to the portion of the second frame that will be received.

At block 1016, the adjustments to the target SIR value are removed. This may involve removing adjustments to the target SIR value introduced as part of blocks 1006 and/or 1014. The adjustments to the target SIR value may be removed based on completion of the frame period for the second frame.

Figure 11:
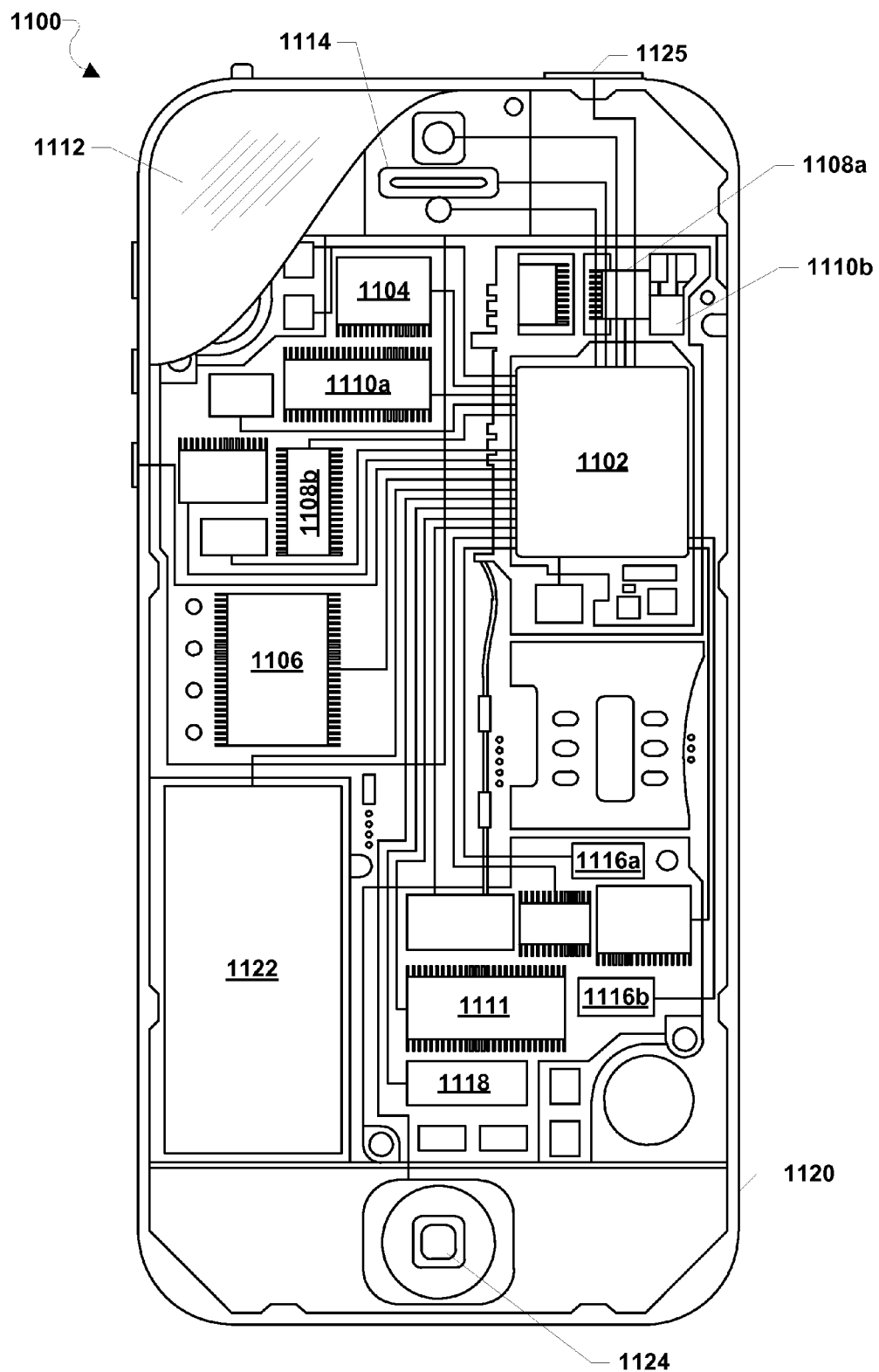
FIG. 11 is a component block diagram of a user equipment suitable for use with various embodiments.

The various embodiments may be implemented in any of a variety of UEs, an example of which 1100 (UE 200 of FIG. 2, which may correspond to the UE 110 in FIG. 1) is illustrated in FIG. 11. As such, the UE 1100 may implement the process and/or the apparatus of FIGS. 1-10, as described herein.

With reference to FIGS. 1-11, the UE 1100 may include a processor 1102 coupled to a touchscreen controller 1104 and an internal memory 1106. The processor 1102 may correspond to the processor 201. The processor 1102 may be one or more multi-core integrated circuits designated for general or specific processing tasks. The internal memory 1106 may correspond to the memory 202. The memory 1106 may be volatile or non-volatile memory, and may also be secure and/or encrypted memory, or unsecure and/or unencrypted memory, or any combination thereof. The touchscreen controller 1104 and the processor 1102 may also be coupled to a touchscreen panel 1112, such as a resistive-sensing touchscreen, capacitive-sensing touchscreen, infrared sensing touchscreen, etc. Additionally, the display of the UE 1100 need not have touch screen capability. The touch screen controller 1104, the touchscreen panel 1112 may correspond to the user interface 203.

The UE 1100 may have one or more cellular network transceivers 1108a, 1108b coupled to the processor 1102 and to two or more antennae 1110 and configured for sending and receiving cellular communications. The transceivers 1108 and antennae 1110a, 1110b may be used with the above-mentioned circuitry to implement the various embodiment methods. The UE 1100 may include two or more SIM cards 1116a, 1116b, corresponding to SIM A 206 and SIM B 207, coupled to the transceivers 1108a, 1108b and/or the processor 1102 and configured as described above. The UE 1100 may include a cellular network wireless modem chip 1111 that enables communication via a cellular network and is coupled to the processor. The one or more cellular network transceivers 1108a, 1108b, the cellular network wireless modem chip 1111, and the two or more antennae 1110 may correspond to the RF resources 204.

The UE 1100 may include a peripheral device connection interface 1118 coupled to the processor 1102. The peripheral device connection interface 1118 may be singularly configured to accept one type of connection, or multiply configured to accept various types of physical and communication connections, common or proprietary, such as USB, FireWire, Thunderbolt, or PCIe. The peripheral device connection interface 1118 may also be coupled to a similarly configured peripheral device connection port (not shown).

The UE 1100 may also include speakers 1114 for providing audio outputs. The UE 1100 may also include a housing 1120, constructed of a plastic, metal, or a combination of materials, for containing all or some of the components discussed herein. The UE 1100 may include a power source 1122 coupled to the processor 1102, such as a disposable or rechargeable battery. The rechargeable battery may also be coupled to a peripheral device connection port (not shown) to receive a charging current from a source external to the UE 1100. The UE 1100 may also include a physical button 1124 for receiving user inputs. The UE 1100 may also include a power button 1126 for turning the UE 1100 on and off.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for downlink power control, the method comprising:
    determining that a portion of a first frame to be transmitted in a downlink from a base station to a user equipment (UE) may be lost by the UE;
    determining that a portion of the first frame will be received by the UE; and causing a transmit power of the base station to be increased for the portion of the first frame that will be received.

2. The method of claim 1, wherein the transmit power of the base station is caused to be increased for the portion of the first frame that will be received by adjusting a signal-to-interference ratio target value maintained by the UE.

3. The method of claim 2, wherein the signal-to-interference ratio target value is adjusted proportionally to a length of the portion of the first frame that will be received compared to a total length of the first frame.

4. The method of claim 2, wherein the signal-to-interference ratio target value is adjusted to an increased value at the start of the first frame.

5. The method of claim 1, wherein the transmit power of the base station is caused to be increased based on transmitting transmit power control commands from the UE to the base station.

6. The method of claim 1, wherein the portion of the first frame that may be lost is determined based on a scheduled tune-away.

7. The method of claim 1, wherein the portion of the first frame that may be lost is determined based on a tune-away from a first radio access technology to a second radio access technology different from the first radio access technology.

8. The method of claim 1,
wherein the first frame is a frame in a dedicated channel for a first radio access technology, and
wherein the portion of the first frame that may be lost is determined based on a scheduled use of a shared radio for a second radio access technology.

9. The method of claim 1, wherein the portion of the first frame that may be lost is a portion of the first frame that will be transmitted by the base station but that may not be successfully decoded by the UE.

10. The method of claim 1, wherein the portion of the first frame that may be lost and the portion of the first frame that will be received are determined by the UE independent of the base station.

11. The method of claim 1, wherein the portion of the first frame that may be lost and the portion of the first frame that will be received are transmitted by the base station using a same coding rate and scheme.

12. The method of claim 1, wherein the portion of the first frame that may be lost and the portion of the first frame that will be received are transmitted by the base station using a same spreading scheme.

13. The method of claim 1, further comprising:
determining that a portion of a second frame transmitted in the downlink from the base station to the UE has been lost by the UE.

14. The method of claim 13, further comprising:
determining that a portion of the second frame will be received by the UE.

15. The method of claim 14, further comprising:
causing the transmit power of the base station to be increased for the portion of the second frame that will be received.

16. The method of claim 15, wherein the transmit power of the base station is separately caused to be increased for the portion of the first frame that will be received and the portion of the second frame that will be received.

17. The method of claim 15, wherein the transmit power of the base station is caused to be increased for the portion of the second frame that will be received by adjusting a signal-to-interference ratio target value maintained by the UE.

18. The method of claim 17,
wherein the signal-to-interference ratio target value is adjusted to a first signal-to-interference value for the portion of the first frame that will be received,
wherein the signal-to-interference ratio target value is adjusted to a second signal-to-interference value for the portion of the second frame that will be received, and
wherein the first signal-to-interference value and the second signal-to-interference value are different.

19. The method of claim 15, wherein the portion of the first frame that may be lost and the portion of the second frame that may be lost are determined based on a tune-away from a first radio access technology to a second radio access technology different from the first radio access technology.

20. The method of claim 19, wherein the first frame is a first frame in time overlapping with a period of the tune-away and the second frame is a last frame in time overlapping with the period of the tune-away.

21. A user equipment (UE) apparatus for downlink power control, the UE apparatus comprising:
a processor configured to determine that a portion of a first frame to be transmitted in a downlink from a base station to the UE apparatus may be lost by the UE apparatus,
wherein the processor is further configured to determine that a portion of the first frame will be received by the UE apparatus, and
wherein the processor is further configured to cause a transmit power of the base station to be increased for the portion of the first frame that will be received.

22. The UE apparatus of claim 21, wherein the processor is configured to cause the transmit power of the base station to be increased for the portion of the first frame that will be received by adjusting a signal-to-interference ratio target value maintained by the UE apparatus.

23. The UE apparatus of claim 22, wherein the processor is configured to adjust the signal-to-interference ratio target value proportionally to a length of the portion of the first frame that will be received compared to a total length of the first frame.

24. The UE apparatus of claim 21, wherein the processor is configured to determine the portion of the first frame that may be lost based on a scheduled tune-away.

25. The UE apparatus of claim 21, wherein the processor is configured to determine the portion of the first frame that may be lost based on a tune-away from a first radio access technology to a second radio access technology different from the first radio access technology.

26. The UE apparatus of claim 21, wherein the processor is configured to determine the portion of the first frame that may be lost and the portion of the first frame that will be received independent of the base station.

27. The UE apparatus of claim 21,
wherein the processor is further configured to determine that a portion of a second frame transmitted in the downlink from the base station to the UE apparatus has been lost by the UE apparatus,
wherein the processor is further configured to determine that a portion of the second frame will be received by the UE apparatus, and
wherein the processor is further configured to cause the transmit power of the base station to be increased for the portion of the second frame that will be received.

28. The UE apparatus of claim 27, wherein the processor is configured to separately cause the transmit power of the base station to be increased for the portion of the first frame that will be received and the portion of the second frame that will be received.

29. A non-transitory computer-readable medium for downlink power control, the medium comprising instructions configured to cause one or more computing devices to:
- determine that a portion of a frame to be transmitted in a downlink from a base station to a user equipment (UE) may be lost by the UE;
- determine that a portion of the frame will be received by the UE; and
- cause a transmit power of the base station to be increased for the portion of the frame that will be received.

30. A user equipment (UE) apparatus for downlink power control, the UE apparatus comprising:
- means for determining that a portion of a first frame to be transmitted in a downlink from a base station to the UE apparatus may be lost by the UE apparatus;
- means for determining that a portion of the first frame will be received by the UE apparatus; and
- means for causing a transmit power of the base station to be increased for the portion of the first frame that will be received.

* * * * *